United States Patent
Kim et al.

(10) Patent No.: US 8,064,477 B2
(45) Date of Patent: Nov. 22, 2011

(54) MULTI-CHANNEL GENERATING SYSTEM ON WIRED NETWORK

(75) Inventors: Jun Ho Kim, Gangnam-gu (KR); Jung Beom Park, Songpa-gu (KR); Nam Hun Lee, Seodaemun-gu (KR)

(73) Assignee: Infra Access Korea Co., Ltd., Seoul (KR)

( * ) Notice: Subject to any disclaimer, the term of this patent is extended or adjusted under 35 U.S.C. 154(b) by 65 days.

(21) Appl. No.: 12/303,059

(22) PCT Filed: Jun. 1, 2007

(86) PCT No.: PCT/KR2007/002665
§ 371 (c)(1),
(2), (4) Date: Mar. 26, 2009

(87) PCT Pub. No.: WO2007/139362
PCT Pub. Date: Dec. 6, 2007

(65) Prior Publication Data
US 2009/0196283 A1    Aug. 6, 2009

(30) Foreign Application Priority Data
Jun. 1, 2006    (KR) .................. 10-2006-0049462

(51) Int. Cl.
*H04J 3/00*    (2006.01)
(52) U.S. Cl. ........ 370/464; 370/352; 370/386; 370/480; 398/62; 398/69; 398/79

(58) Field of Classification Search .................. None
See application file for complete search history.

(56) References Cited

U.S. PATENT DOCUMENTS

| | | | |
|---|---|---|---|
| 5,615,036 A * | 3/1997 | Emura ........................... 398/76 |
| 5,809,395 A * | 9/1998 | Hamilton-Piercy et al. .. 725/106 |
| 6,353,490 B1 * | 3/2002 | Singer et al. .................... 398/66 |
| 6,452,945 B1 | 9/2002 | Upham et al. |
| 6,529,303 B1 | 3/2003 | Rowan et al. |
| 7,127,734 B1 * | 10/2006 | Amit ............................... 725/80 |
| 2006/0251115 A1 * | 11/2006 | Haque et al. .................. 370/466 |
| 2007/0276926 A1 * | 11/2007 | LaJoie et al. .................. 709/219 |

* cited by examiner

*Primary Examiner* — Salman Ahmed
*Assistant Examiner* — Nicholas Sloms
(74) *Attorney, Agent, or Firm* — Merchant & Gould P.C.

(57) ABSTRACT

The present invention relates to a multi-channel provision system for a wired network. The multi-channel provision system of the present invention includes a tap-off unit (330) for dividing a frequency band, assigned to a wired network for network communication, and providing resultant frequency bands to respective subscriber units belonging thereto. An optical network device (100) is disposed at a node where one or more sectors, divided according to a number of subscriber units that enable network access through the wired network, branch off. The optical network device (100) provides a frequency band for network access to each sector so that a same frequency band is assigned to each sector, thus generating a multi-channel for the frequency band, and reusing the frequency band, assigned to the wired network, a number of times corresponding to the number of the sectors through generation of the multi-channel.

12 Claims, 6 Drawing Sheets

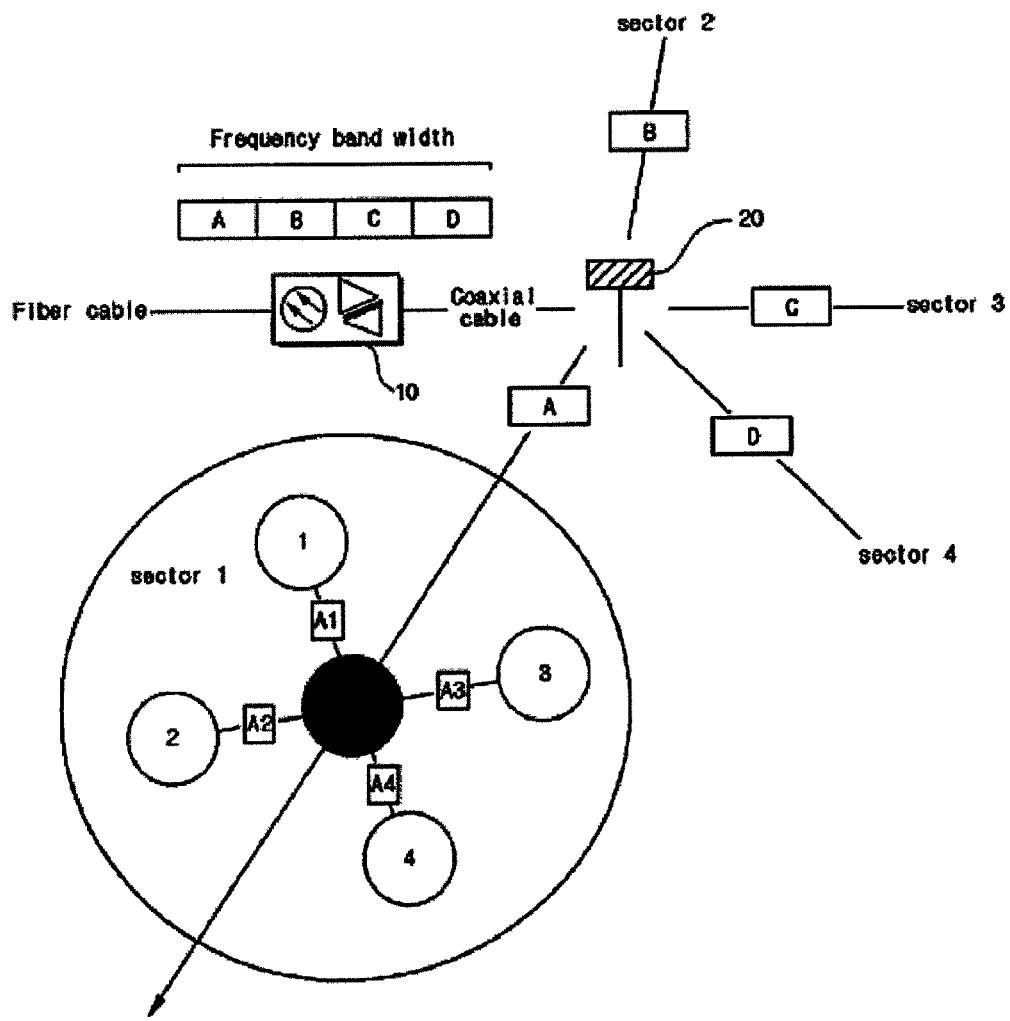
[FIG. 1]
PRIOR ART

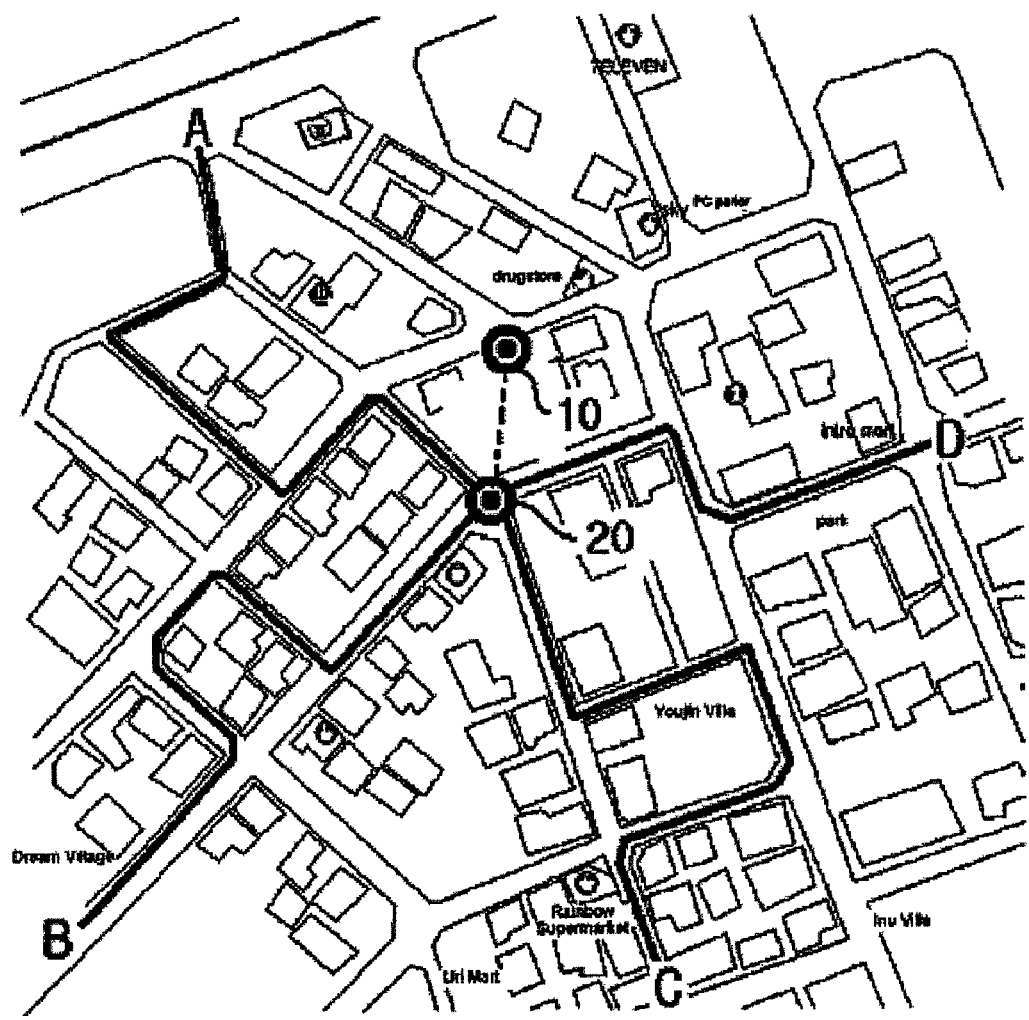
[FIG. 2]
PRIOR ART

[Fig. 3]
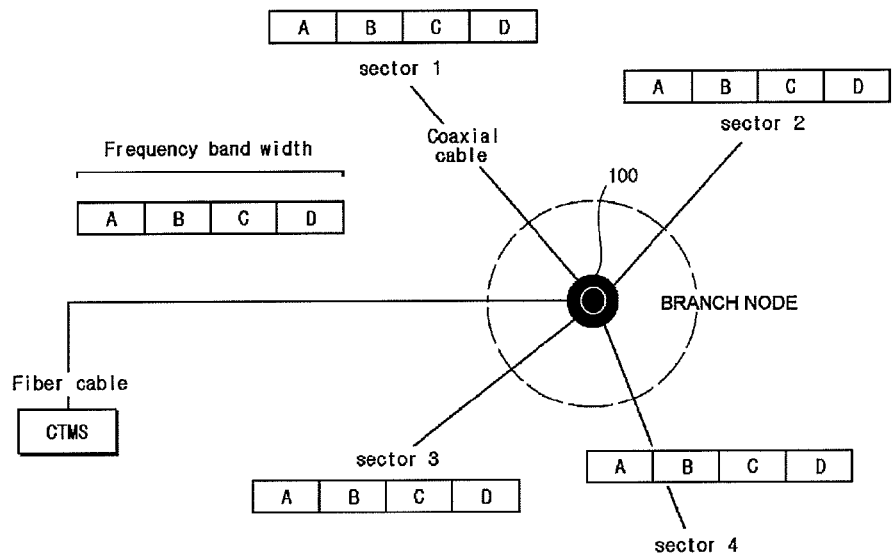
[Fig. 4]
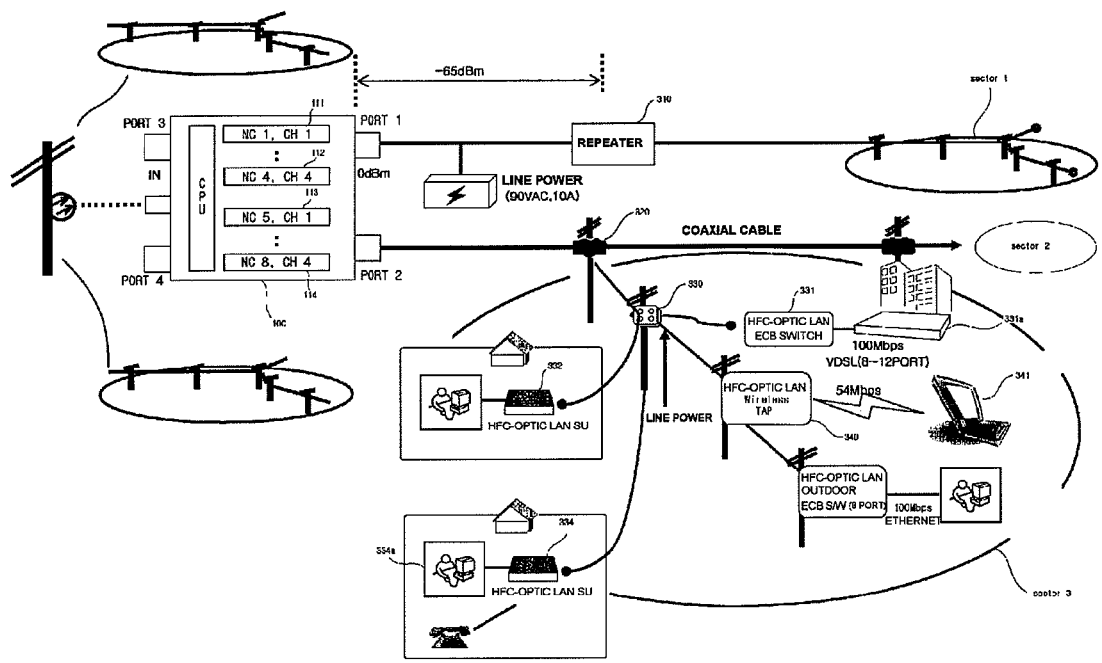

[Fig. 5]
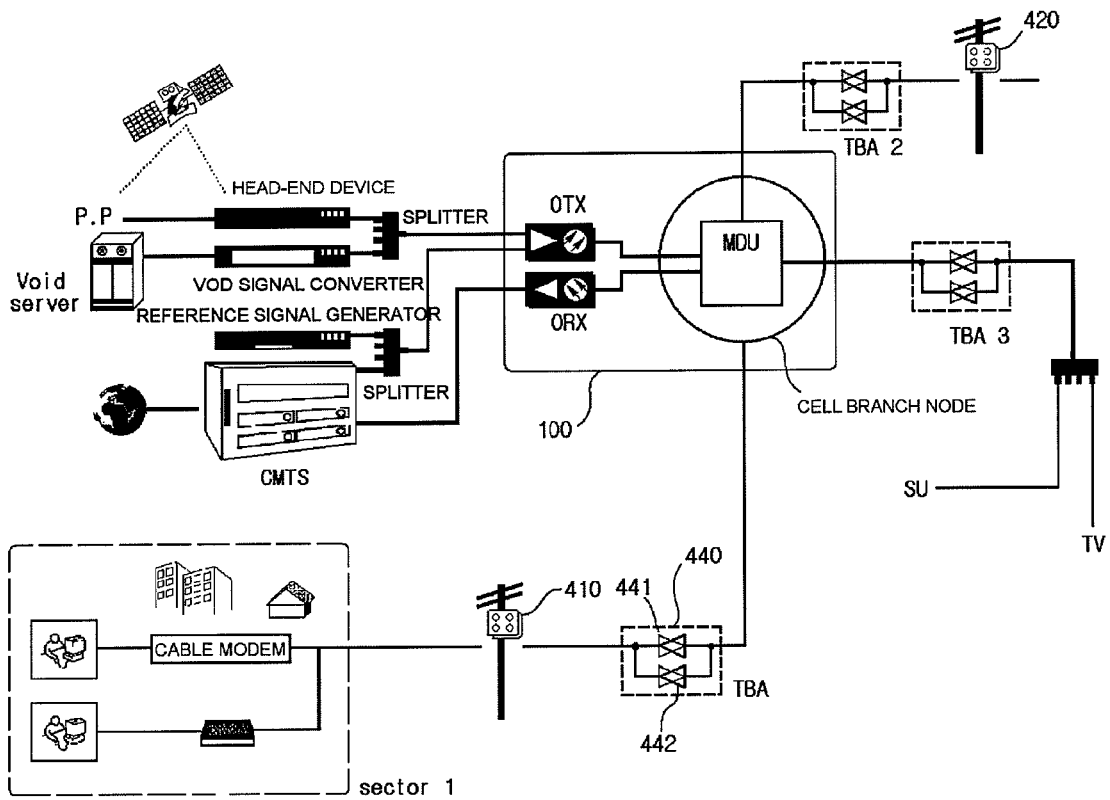
[Fig. 6]
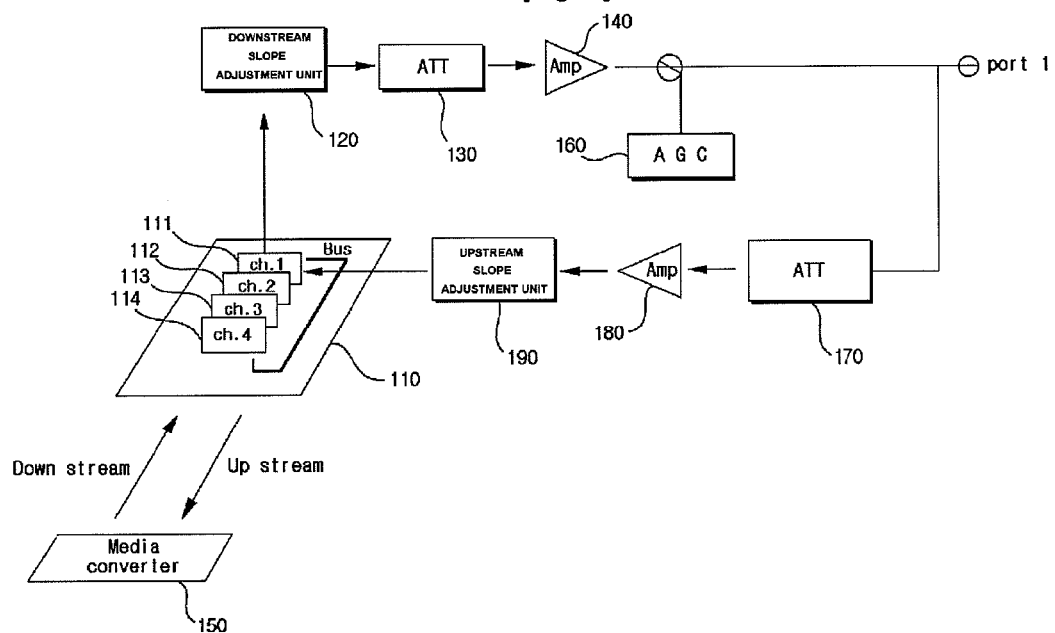

[Fig. 7]
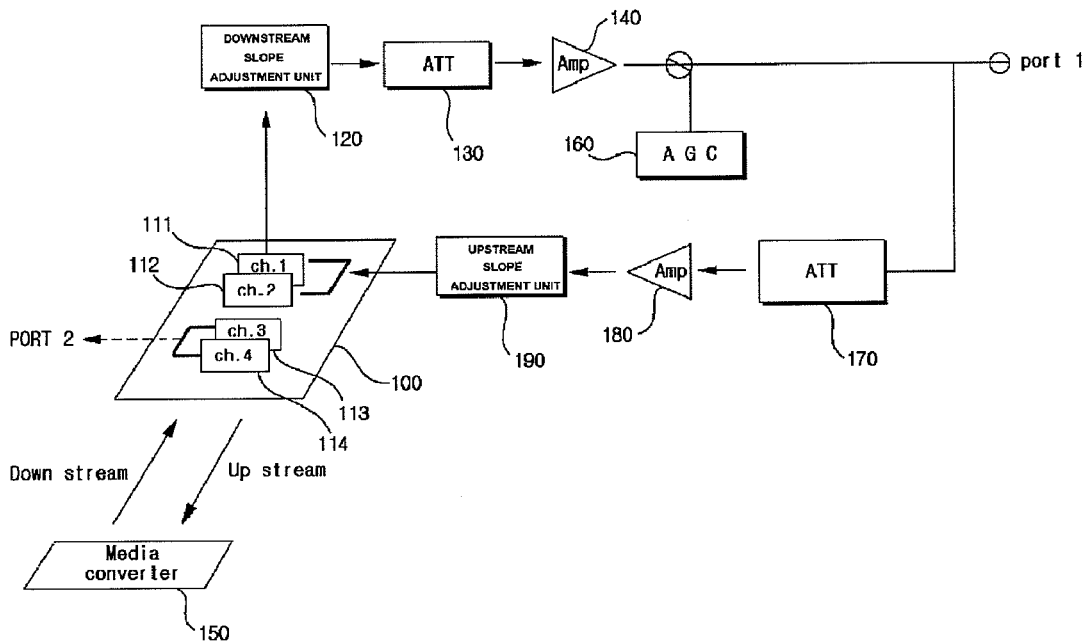
[Fig. 8]
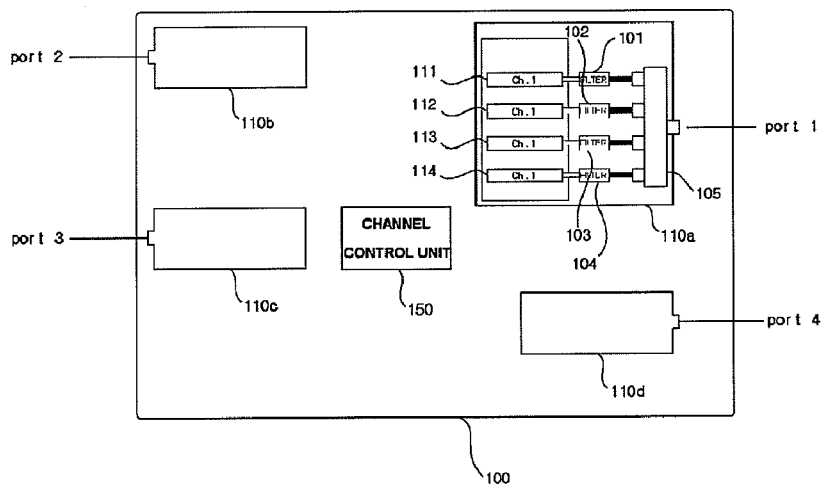
[Fig. 9]
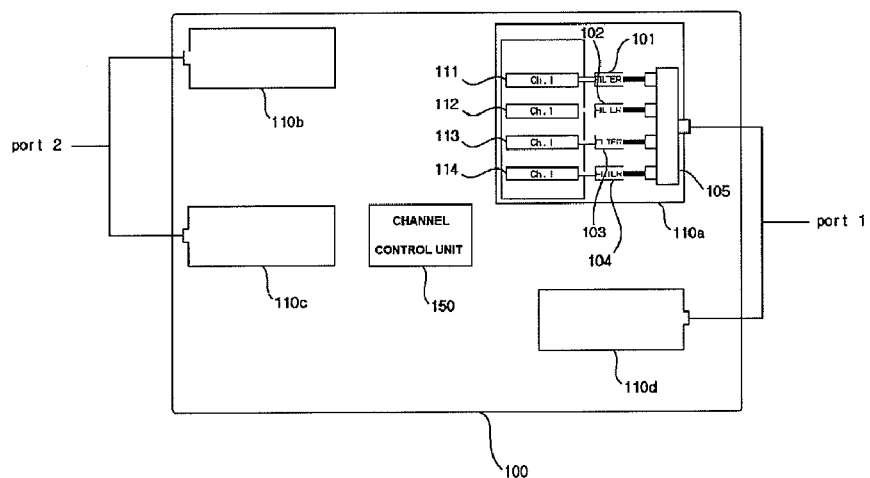

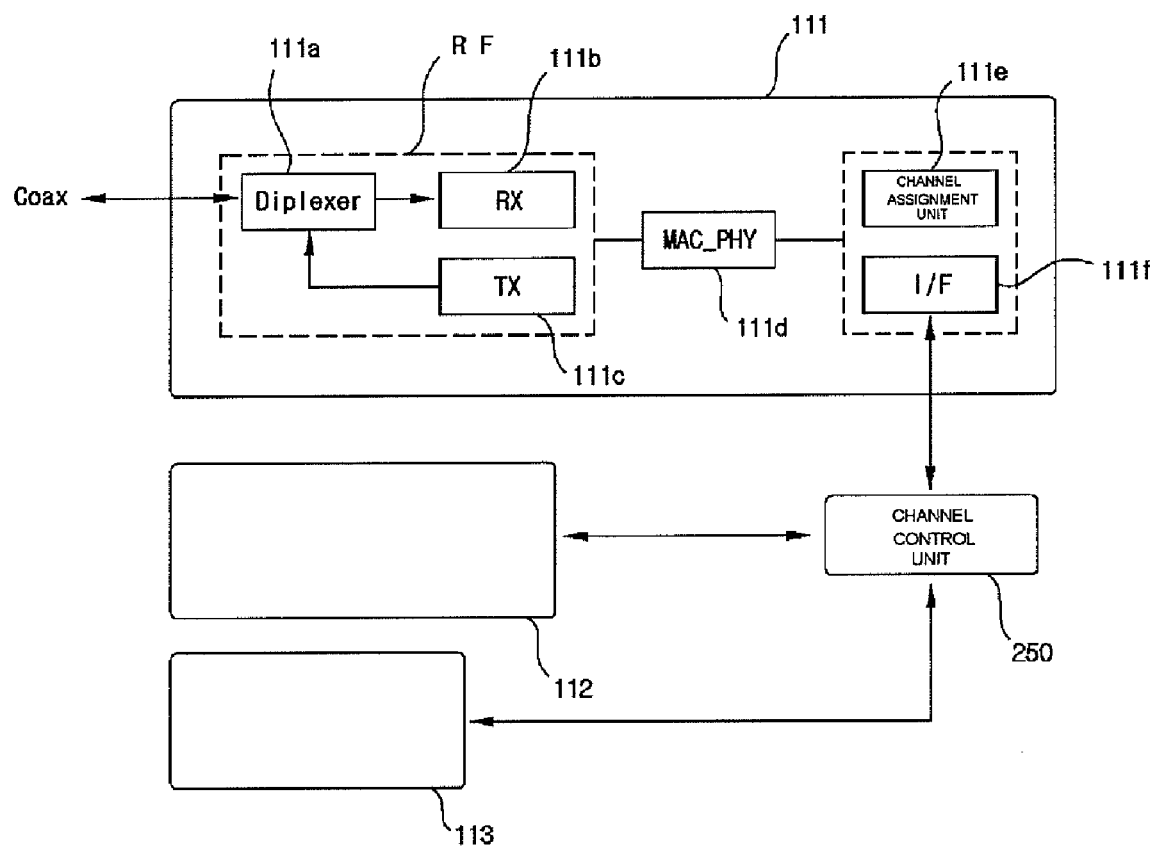
[Fig. 10]

MULTI-CHANNEL GENERATING SYSTEM ON WIRED NETWORK

This application is a National Stage Application of PCT/KR2007/002665, filed 1 Jun. 2007, which claims benefit of Serial No. 10-2006-0049462, filed 1 Jun. 2006 in Korea and which application(s) are incorporated herein by reference. To the extent appropriate, a claim of priority is made to each of the above disclosed applications.

TECHNICAL FIELD

The present invention relates, in general, to a multi-channel provision system for a wired network, and, more particularly, to a multi-channel provision system for a wired network, which generates a multi-channel having the same frequency band for a wired network having a limited bandwidth, thus improving the data transfer rate of each subscriber unit while increasing the frequency band assignable to each subscriber, through the generation of the multi-channel.

BACKGROUND ART

Generally, a conventional cable broadcasting network is aimed principally at the transmission of cable broadcast signals to the TVs of subscribers. Therefore, the conventional cable broadcasting network is constructed to connect a wired network (for example, a coaxial cable network) to the homes of respective cable television subscribers through an Optical Node Unit (ONU), and to transmit cable broadcast signals over the connected wired network. In a conventional wired network, sectors are obtained by dividing a target area, to which cable broadcast signals are to be transmitted, into several regions, and there is no need to connect the terminals of respective sectors, which are connected to an ONU, to each other. That is, the conventional cable broadcasting network has a structure in which wired networks extend radially around the ONU. Therefore, when Internet services are provided using the conventional cable broadcasting network, respective sectors have independent characteristics therebetween.

FIG. 1 is a diagram conceptually showing a method of assigning frequencies to respective subscriber units in a conventional Hybrid Fiber Coaxial (HFC) network.

Reference numeral 10 denotes an ONU disposed between an optical cable and a coaxial cable. The ONU 10 performs signal conversion between a cable broadcasting company, connected through an optical cable, and subscriber units, connected through a coaxial cable. Of the bandwidth provided from the ONU 10 to the coaxial cable, frequency bands A, B, C, and D, which can be assigned for the Internet, range from approximately 540 MHz to 900 MHz. The ONU 10 provides the assigned frequency bands to a tap-off unit 20. The tap-off unit 20 distributes the assigned frequency bands to respective sectors 1 to 4. That is, the frequency bands A, B, C, and D are assigned to the sectors 1, 2, 3, and 4, respectively. Each of the sectors is a region in which a cable network is assigned to a plurality of subscriber units. In the case of the sector 1, the frequency band A is divided into frequency bands A1, A2, A3 and A4, and the resulting frequency bands A1, A2, A3, and A4 are assigned to subscriber units 1 to 4, respectively. That is, in conventional Internet services provided through a wired network, the bandwidth assigned to each of the subscriber units 1 to 4 decreases in proportion to the number of subscribers connected to a unit sector (for example, sector 1), thus resulting in a decrease in the data transfer rate of each subscriber unit. Further, since the sectors 1 to 4 use frequency bands assigned to and distributed by the ONU 10, there is a problem in that the number of subscriber units that can be covered by the ONU 10 is limited.

FIG. 2 is a diagram showing an example in which a cable network is deployed by a cable broadcasting company.

As shown in the drawing, since the conventional cable network is deployed to provide cable broadcasts to subscribers through a wired connection, it is disposed radially around the ONU 10, and the end terminals of the cable network do not meet each other. A typical network is configured to have a ring topology, in which end terminals of a network meet each other, in order to secure the stability of data transmission, while a cable network is typically configured in a radial topology, in which the end terminals of the cable network are not connected to each other, because the cable network only sends broadcasts from a cable broadcasting station to subscribers. The applicant of the present invention discards the conventional network configuration method of configuring a network in such a manner that the tap-off unit 20 assigns frequency bands, assigned by the ONU 10, to the respective sectors 1 to 4 equally, and proposes an optical network device for generating a multi-channel, in which the same frequency band is assigned to the sectors 1 to 4, so that the same frequency band can be reused, thus increasing the frequency band assignable to respective subscriber units and also increasing the data transfer rate of respective subscriber units.

DISCLOSURE OF INVENTION

Technical Problem

Accordingly, the present invention has been made keeping in mind the above problems occurring in the prior art, and an object of the present invention is to provide a multi-channel provision system for a wired network, which generates a multi-channel for a frequency band assigned to a wired network for Internet access, thus reusing the same frequency band a number of times corresponding to the number of sectors, and increasing the network communication speed of each subscriber while increasing the frequency band assigned to each subscriber unit, through the generation of the multi-channel.

Technical Solution

In order to accomplish the above object, the present invention provides a multi-channel provision system for a wired network, comprising a tap-off unit for dividing a frequency band, assigned to a wired network for network communication, and providing resultant frequency bands to respective subscriber units belonging thereto, and an optical network device disposed at a node where one or more sectors, divided according to a number of subscriber units that enable network access through the wired network, branch off, the optical network device providing a frequency band for network access to each sector so that a same frequency band is assigned to each sector, thus generating a multi-channel for the frequency band, and reusing the frequency band, assigned to the wired network, a number of times corresponding to the number of the sectors through generation of the multi-channel.

Preferably, the multi-channel provision system may further comprise at least one repeater disposed between the optical network device and each of the subscriber units, the repeater amplifying intensity of network packet signals, thus increasing possible communication distance between the optical network device and the subscriber unit.

Preferably, the multi-channel provision system may further comprise a splitter constructed so that, when two or more sectors correspond to the frequency band assigned to a single wired network in the optical network device, the splitter is disposed between the two or more sectors and the optical network device and is adapted to distribute the frequency band assigned by the optical network device according to the number of sectors and to assign distributed frequency bands to the two or more sectors.

Preferably, the multi-channel provision system may further comprise an Ethernet Coaxial Bridge (ECB) constructed so that, when the subscriber unit is connected to the network through an x Digital Subscriber Line (xDSL) modem, the ECB is disposed between the tap-off unit and the xDSL modem and is adapted to process signal conversion between the xDSL modem and the tap-off unit.

Preferably, each of the subscriber units may be one of a Voice over Internet Protocol (VoIP) modem, a cable modem, and an xDSL modem.

Preferably, the multi-channel provision system may further comprise an Access Point (AP) disposed between the tap-off unit and a wireless communication device and adapted to perform wireless communication with the wireless communication device.

Preferably, the optical network device may comprise at least one channel card mounted on a motherboard having a bus, and adapted to provide the same frequency band to each sector, thus generating the multi-channel for the frequency band, and a media converter for processing signal conversion between an optical network and the motherboard.

Preferably, the optical network device may assign the same frequency band that is assigned to any one of subscriber units belonging to each sector, to any one of subscriber units belonging to another sector.

Preferably, the channel card may be provided such that a number of channel cards corresponding to the number of sectors is provided in the motherboard.

Preferably, the channel card may be provided such that at least two channel cards correspond to any one of the sectors and the frequency band is divided according to the number of channel cards.

Preferably, the multi-channel provision system may further comprise a channel control unit for arranging a subscriber unit in any one of channel cards corresponding to a sector to which the subscriber unit belongs, when a communication channel access request is generated by the subscriber unit.

Preferably, the channel control unit may be operated such that, when a communication channel access request is generated by the subscriber unit, the channel control unit makes the subscriber unit correspond to any one of channel cards corresponding to a sector, to which the subscriber unit belongs, channel connection being sequentially performed for the channel cards.

Preferably, the channel control unit may be operated such that, when a communication channel access request is generated by the subscriber unit, the channel control unit makes the subscriber unit correspond to a channel card having a smallest number of channels formed with subscriber units, among channel cards corresponding to a sector to which the subscriber unit belongs.

Preferably, the multi-channel provision system may further comprise a filter connected to an output terminal of at least one channel card corresponding to the sector and adapted to pass therethrough only a frequency band assigned to the channel card.

Preferably, the channel card may comprise a diplexer for separating a frequency band, which is assigned to Internet communication, and a frequency band, which is assigned to broadcast signals, from the frequency band assigned to the sector, a Radio Frequency (RF) unit for performing RF communication with the sector according to the frequency band assigned by the diplexer for the Internet communication, and a bus interface unit for performing data communication with the media converter through the bus of the motherboard.

Advantageous Effects

The present invention can generate a multi-channel for a wired network using the characteristics of the wired network, which is divided into respective sectors, and can provide a wide frequency band to each subscriber unit through the formed multi-channel. Through this structure, each subscriber unit can obtain a higher communication speed compared to conventional network access using a wired network. Further, at a node where respective sectors branch off, a single frequency band is reused a number of times corresponding to the number of sectors, thus efficiently utilizing frequency resources. Moreover, a sector having a large number of subscriber units is made to correspond to a plurality of channel cards instead of dividing a frequency band into narrow frequency bands, thus being able to handle a large number of subscriber units.

BRIEF DESCRIPTION OF THE DRAWINGS

FIG. 1 is a diagram conceptually showing a method of assigning frequencies to respective subscriber units in a conventional Hybrid Fiber Coaxial (HFC) network;

FIG. 2 is a diagram showing an example in which a cable network is deployed by a cable broadcasting company;

FIG. 3 is a conceptual diagram showing a multi-channel provision system for a wired network according to the present invention;

FIG. 4 is a conceptual block diagram showing an embodiment of the present invention;

FIG. 5 is a conceptual block diagram showing another embodiment of the present invention;

FIG. 6 is a conceptual block diagram showing the optical network device of FIGS. 4 and 5 according to an embodiment of the present invention;

FIG. 7 is a conceptual block diagram showing an optical network device according to another embodiment of the present invention;

FIG. 8 is a conceptual block diagram showing an optical network device according to a further embodiment of the present invention;

FIG. 9 is a conceptual block diagram showing an optical network device according to yet another embodiment of the present invention; and FIG. 10 is a conceptual block diagram showing an embodiment of a channel card mounted in an optical network device.

DESCRIPTION OF REFERENCE CHARACTERS OF IMPORTANT PARTS

100: optical network device 310: repeater
320: splitter 330, 340, 410: tap-off unit

BEST MODE FOR CARRYING OUT THE INVENTION

Hereinafter, embodiments of the present invention will be described in detail with reference to the attached drawings.

FIG. 3 is a conceptual view showing a multi-channel provision system for a wired network according to the present invention.

As shown in the drawing, in the present invention, an optical network device 100 for generating a multi-channel is arranged at a node where respective sectors 1 to 4 branch off. The arranged optical network device 100 provides an assigned frequency band to respective sectors 1 to 4, thus generating a multi-channel for the assigned frequency band. In this case, the sectors are obtained by dividing a target area, to which cable broadcast signals are to be transmitted by a cable broadcasting company, into several regions. In each sector, a tap-off unit for dividing and assigning a frequency band to subscriber units belonging to the sector is provided.

The optical network device 100 provides the frequency band assigned thereto to respective sectors 1 to 4. In this case, the optical network device 100 must be disposed at the location at which respective sectors radially branch off. This follows the characteristics of the structure of a typical cable broadcasting network, which is described above with reference to FIGS. 1 and 2, and in which the terminals of respective cable broadcasting networks, passing through the sectors 1 to 4, are mutually independent. The optical network device 100 provides the same frequency band A, B, C and D to respective sectors 1 to 4 using the characteristic in which the cable broadcasting networks passing through the sectors 1 to 4 are mutually independent. Accordingly, the frequency band assigned by the optical network device 100 is equally provided to respective sectors 1 to 4, and each subscriber unit can be assigned a frequency band wider than that of a conventional subscriber unit (refer to FIG. 1).

FIG. 4 is a conceptual block diagram showing an embodiment of the present invention.

This embodiment shows a system in which an optical network device 100 assigns a frequency band based on a multi-channel to each of the sectors 1 to 4. In the drawing, port 1 provides a frequency band based on a multi-channel to a sector 1 via a repeater 310. In this case, a coaxial cable connected to the port 1 is supplied with line power so as to perform long-distance transmission between the optical network device 100 and the sector 1. The line power is typically AC 60V to 90V, and can be used as operating power for a device (for example, a repeater) placed on a coaxial cable.

A port 2 provides a frequency band to a plurality of tap-off units 330 and 340 through a splitter 320. When two or more sectors (for example, sector 2 and sector 3) are connected to a single port (for example, port 2), the splitter 320 bisects the frequency band assigned by the port 2, and provides the bisected frequency bands to respective sectors (for example, sector 2 and sector 3). The tap-off units 330 and 340 connected to the splitter 320 in an array form may have forms according to the items described below.

1) A basic form of providing the frequency band provided by the splitter 320 to a subscriber unit 332 belonging to the splitter 320. In the drawing, only a single subscriber unit 332 is exemplified, but the tap-off unit 330 is typically connected to a plurality of subscriber units, and divides the frequency band, assigned by the splitter 320, by n (where n is the number of subscriber units connected to the tap-off unit 330) according to the number of subscriber units connected to the tap-off unit 330.

2) A bridge form of assigning the frequency band provided by the splitter 320 to an existing x Digital Subscriber Line (xDSL) modem 331a. In this case, a bridge for performing signal conversion (Electronic Coaxial Bridge: ECB) between the tap-off unit 330 and the xDSL modem 331a is required. A bridge 331 must provide both the function of converting a signal from the xDSL modem 331a into the signal format of a cable modem, and the function of converting a signal provided by the tap-off unit 330 to the xDSL modem 331a into the signal format of the xDSL modem 331a according to the format of the cable modem.

3) The tap-off unit 340 can be provided in the form of an Access Point (AP) on a telephone pole. The tap-off unit 340 having the form of the AP enables wireless network access for a specific area among areas in which wired networks are deployed. The tap-off unit 340 is constructed to perform wireless communication with a wireless communication terminal 341 and wired communication with the splitter 320 or the optical network device 100.

When the tap-off unit has the form of 1), a user terminal connectable to the tap-off unit 330 may be a cable modem. When the tap-off unit has the form of 2), the tap-off unit 330 may be one of a cable modem, an xDSL modem, and a Voice over Internet Protocol (VoIP) modem. In this case, when the VoIP modem is connected to the tap-off unit 330, the subscriber unit 334 preferably simultaneously processes network access and telephone communication (VoIP call). For this operation, the VoIP modem 334 is preferably implemented in a structure in which the function of a typical cable modem and a typical VoIP communication function are integrated.

Meanwhile, in the forms of 1) to 3), each of the tap-off units 330 and 340 is connected in series with the splitter 320 through an array structure, but this structure is only an example. Each of the tap-off units 330 and 340 can be directly connected to the splitter 320, and can suitably divide and use the frequency band provided by the splitter 320. Further, in the drawing, the splitter 320 is connected to the port 2, but, when only a single sector (for example, sector 2) is connected to the port 2, the splitter 320 is not necessary. In this case, the tap-off units 330 and 340 may be directly connected to the port 2, or may be connected in series with the port 2.

MODE FOR THE INVENTION

FIG. 5 is a conceptual block diagram showing another embodiment of the present invention.

This embodiment is similar to that of FIG. 4, but shows the case where broadcast signals and network packets coexist in a wired network. Therefore, this embodiment uses the above items 1) to 3) in FIG. 4, but a drawing and description thereof are omitted. As shown in the drawing, an optical network device 100 is connected to a Cable Modem Termination System (CMTS), a reference signal generator, a Video-on-Demand (VOD) signal converter, and a head-end device through an optical transmission unit (OTX) and an optical reception unit (ORX). In the drawing, the head-end device and the VOD signal converter are devices for converting broadcast content, which is provided through a Program Provider (P.P) or a VOD server, into optical signals and transmitting the optical signals to the optical network device 100. The reference signal generator generates a reference signal, required to realize synchronization between the CMTS, the optical network device 100, and subscriber units. The CMTS assigns a frequency band required for Internet access to the optical network device 100, and authenticates each subscriber unit. In a hybrid network, in which network packet signals and cable broadcast signals are provided through a coaxial cable, a device such as a Trunk Bridger Amplifier (TBA) 440 must be disposed between the optical network device 100 and a tap-off unit 410. The TBA 440 separately amplifies the cable broadcast signals and the network packet signals. In the cable broadcasting network, a frequency band of about 540 MHz to 800 MHz is assigned to network communication, and the remaining frequencies are assigned to cable broadcast signals. The present invention is configured to assign a frequency band of 975 MHz to 1525 MHz to network communication, and the remaining frequencies are assigned to cable broadcast signals. This will be described in detail later. Therefore, the TBA 440 includes a first amplification unit 441 for amplifying a frequency band less than 975 MHz and a second amplification unit 442 for amplifying a frequency band equal to or greater than 975 MHz. The first amplification unit 441 and the second amplification unit 442 function as a bi-directional amplifier. Accordingly, the TBA 440 amplifies both network packet signals transmitted from a sector (for example, sector 1) to the optical network device 100, and network packet signals transmitted in the opposite direction. In the drawing, an example in which TBA 3 provides amplified cable broadcast signals and amplified network packet signals to a TV and a Subscriber Unit (SU), respectively, is shown.

FIG. 6 is a conceptual block diagram showing the optical network device of FIGS. 4 and 5 according to an embodiment of the present invention.

An optical network device 100 includes channel cards 111 to 114 mounted on a motherboard 110, a downstream slope adjustment unit 120, a first attenuator 130, a first pre-amplifier 140, an Auto Gain Controller (AGC) 160, a second attenuator 170, a second pre-amplifier 180, an upstream slope adjustment unit 190, and a media converter 150.

This embodiment is shown only for a single port (port 1) of a plurality of ports provided in the optical network device 100. Therefore, a description is made on the basis of the channel card 111 of the channel cards 111 to 114, and FIG. 3 is also referred to for convenience of description and understanding.

The channel cards 111 to 114 mounted on the motherboard 110 are connected respectively to sectors 1 to 4 using the same frequency band. Each of the channel cards 111 to 114 can alternatively be connected to one or more sectors, but here a single sector (for example, sector 1) is connected to a single channel card.

In the drawing, the channel card 111 and peripheral component blocks related to the channel card 111 are described below.

The downstream slope adjustment unit 120 adjusts the attenuation rate of network packets that are transmitted from the optical network device 100 to the subscriber unit. Typically, the intensity of signals transmitted through the coaxial cable is decreased in proportion to the length of the coaxial cable. In this case, the attenuation rate of the intensity of the signals, passing through the coaxial cable, differs according to the frequency of the signals. The attenuation of high frequency signals is more serious than that of low frequency signals. The downstream slope adjustment unit 120 adjusts the attenuation rate of high frequency signals. If the optical network device according to the embodiment of the present invention is operated in a hybrid network in which network packet signals and cable broadcast signals are used together, the cable broadcast signals are low frequency signals and the frequency band of network packets is a high frequency band. Further, when the upstream and downstream transmission bands of network packets are different from each other, for example, when network packets are transmitted in a downstream transmission band from 975 MHz to 1525 MHz and are transmitted in an upstream transmission band from 0 MHz to 40 MHz, the downstream transmission band is a high frequency band and the upstream transmission band is a low frequency band. Of course, the downstream slope adjustment unit 120 according to the embodiment of the present invention can download or upload network packets by separating the upstream and downstream transmission bands, or can set upstream and downstream transmission bands for a frequency band equal to or greater than 975 MHz, or can process both upstream transmission and downstream transmission in a Time Division Multiple Access (TDMA) manner, without separating a frequency band of 975 MHz to 1525 MHz into upstream and downstream frequency bands. The upstream slope adjustment unit 190 is operated in a manner opposite the upstream slope adjustment unit. The upstream slope adjustment unit 190 adjusts the attenuation rate of network packets that are transmitted from the subscriber unit to the optical network device 100.

The first attenuator 130 attenuates the output signal of the downstream slope adjustment unit 120 to a level required by the input stage of the first pre-amplifier 140. The first pre-amplifier 140 amplifies the output signal of the first attenuator 130 and outputs the amplified signal to the port 1. The AGC 160 receives the output of the first pre-amplifier 140 as an input, and performs a control operation so that the output gain of the first pre-amplifier 140 has a certain level. The second pre-amplifier 180 and the second attenuator 170 perform functions similar to those of the above-described first pre-amplifier 140 and first attenuator 130, respectively, but there is a difference in that they are applied to upstream network packet signals. The media converter 150 provides an interface between the optical cable and the motherboard 110, and processes signal conversion therebetween. The media converter 150 converts optical signals, received through the optical cable, into network packets, converts network packets, received through the motherboard 110, into optical signals, and transmits the optical signals to the optical cable.

FIG. 7 is a conceptual block diagram showing an optical network device according to another embodiment of the present invention.

The optical network device 100 is similar to that of FIG. 6, but there is a difference in that a plurality of channel cards (for example, channel cards 111 and 112) mounted on a motherboard 110 correspond to a single port (port 1). The construction of such channel cards is characterized in that, when the number of subscriber units belonging to a single sector is large, a plurality of channel cards (for example, channel cards 111 and 112) are grouped into a single unit and are made to correspond to a single port 1, thus allowing a plurality of channel cards (for example, channel cards 111 and 112) to cover a sector in which a plurality of subscribers is located.

FIG. 8 is a conceptual block diagram showing an optical network device according to a further embodiment of the present invention.

This embodiment is similar to those of FIGS. 6 and 7, but channel groups 110a to 110d are formed for respective sectors, and each of the channel groups 110a to 110d assigns a plurality of channel cards (for example, channel cards 111 to 114) to a sector in charge (for example, sector 1). The channel cards 111 to 114, assigned to the channel group 110a, use frequency bands divided from a frequency band assigned to the channel groups 110a to 110d. In this case, since the frequency bands assigned to the channel groups (for example, 110a to 110d) are the same, and the channel groups 110a to 110d have the same structure, descriptions of the channel groups 110b to 110d are replaced with the description of the channel group 110a, and redundant descriptions are omitted in the present specification.

The channel group 110a forms a communication channel with a sector (for example, sector 1) through the port 1, and assigns four channel cards 111 to 114 so as to form the communication channel with the sector 1. This is useful when the number of subscriber units in a unit sector (for example, sector 1) is large. When the number of subscriber units belonging to the unit sector (for example, sector 1) is small, the motherboard 110 and the channel cards 111 to 114 are preferably implemented in the form of FIG. 6. In this case, the channel cards are preferably implemented on the basis of one of Peripheral Component Interconnect (PCI), which is an interface standard that is currently widely used, PCI-express, and micro PCI (mPCI) standards.

The channel group 110a assigns ¼ of the assigned frequency band to each of the channel cards 111 to 114 belonging thereto. Of course, in the drawing, four channel cards are provided for the channel group 110a, but the number of channel cards may be greater than or less than four. The frequency band assigned to each of the channel cards 111 to 114 can be increased or decreased according to the number of channel cards located in the channel group 110a. The channel cards 111 to 114 are connected to the port 1 through a splitter 105, the port 1 being connected to the sector (for example, sector 1) that uses a coaxial network. Therefore, each of the channel cards 111 to 114 must perform communication only in a frequency band assigned thereto. For this operation, filters 101 to 104 are disposed between the splitter 105 and respective channel cards 111 to 114. Each of the filters 101 to 104 functions as a band pass filter for a frequency band assigned to the connected channel card (for example, one of the channel cards 111 to 114). For example, when frequency bands of 975 MHz to 1025 MHz, 1125 MHz to 1175 MHz, 1300 MHz to 1350 MHz, and 1475 MHz to 1525 MHz are assigned to the channel cards 111, 112, 113, and 114, respectively, the filters 101, 102, 103, and 104 are constructed to pass therethrough only frequency bands of 975 MHz to 1025 MHz, 1125 MHz to 1175 MHz, 1300 MHz to 1350 MHz, and 1475 MHz to 1525 MHz, respectively. In this case, the frequency bands of the channel cards 111 to 114 provided in the channel group 110a are identical to those of the channel cards (not shown) provided in other channel groups 110b to 110d, and the filters 101 to 104 provided in the channel group 110a can also be used for other channel groups 110b to 110d in the same manner. As described above, in the present invention, since respective sectors 1 to 4 use the same frequency band, the channel group 110a uses the same frequency band as the channel groups 110b, 110c, and 110d, and the channel cards provided in the channel groups 110b to 110d and filters connected to the channel cards have the same frequency characteristics as the channel cards 111 to 114 and the filters 101 to 104, which are provided in the channel group 110a. Moreover, since a single frequency band assigned by a cable broadcasting company can be simultaneously used by a plurality of sectors 1 to 4, the channel groups 110a to 110d can provide wider frequency bands to the sectors 1 to 4 than a conventional ONU. Therefore, the conventional ONU, which divides a designated frequency band (for example, a frequency band from 975 MHz to 1525 MHz) according to the number of sectors and allows each of the sectors to divide a divided frequency band again according to the number of subscriber units belonging thereto requires a precise band pass filter for identifying respective subscriber units. In contrast, the filters 101 to 104 according to the present embodiment do not need to be as precise as those of the conventional filter. This greatly decreases the cost of the filters mounted on the motherboard 110. Meanwhile, in this embodiment, the channel groups 110a to 110d are connected to the ports 1 to 4, respectively, but each of the ports 1 to 4 can be connected to one or more sectors. When a single port (for example, port 1) is connected to two or more sectors (for example, sector 1 and sector 2), each sector (for example, sector 1 or sector 2) bisects a frequency band assigned to a single port (for example, port 1).

However, even in this case, since the optical network device 100 according to the embodiment forms four multi-channels for a single frequency band, the number of subscriber units managed by each of the sectors 1 to 4 can be reduced. Under the same condition, a frequency band two or more times as wide as that provided by the conventional ONU can be provided to subscriber units. That is, the present embodiment is implemented such that a number of multi-channels proportional to the number of channel groups formed in the motherboard 110 can be formed. Through this, a larger number of frequency bands can be provided to subscriber units belonging to each sector, and the Internet communication speed of each subscriber unit can be improved.

When subscriber units belonging to each of the sectors 1 to 4 request network access, the channel control unit 250 suitably distributes and arranges the subscriber units in the channel cards (for example, channel cards 111 to 114). The channel control unit 250 is equally applied to the channel cards provided in each of the channel groups 110b to 110d. The channel control unit 250 assigns a subscriber unit, belonging to each sector, to any one of channel cards (for example, channel cards 111 to 114) that take charge of the given sector (for example, sector 1), depending on the items described below.

1) A method of sequentially assigning subscriber units to channel cards (for example, 111 to 114) whenever network access is requested by the subscriber units. The subscriber units are assigned in the sequence of the channel cards 111, 112, 113 and 114 whenever a network access request is generated from the subscriber units.

2) A method of assigning a subscriber unit to the channel card having the lowest traffic among the channel cards (for example, channel cards 111 to 114) when network access is requested by the subscriber units.

3) A method of assigning a subscriber unit to the channel card (for example, one of channel cards 111 to 114) to which the smallest number of subscriber units is assigned when network access is requested by subscriber units.

FIG. 9 is a conceptual block diagram showing an optical network device according to yet another embodiment of the present invention.

This embodiment is similar to that of FIG. 8, but there is a difference in that two or more channel groups (for example, 110a and 110b) are made to correspond to a single port (for example, port 1). Through the connection of the channel groups to the port, the number of subscriber units connected through a single port can increase, and the burden of the channel cards belonging to each channel group can be reduced.

In the drawing, the case where four channel groups 110a to 110d correspond to two ports 1 and 2 is shown, but the number of channel groups can be increased according to the number of ports that can be provided in the optical network device 100. For example, when four ports are provided in the optical network device 100, and each port requires two channel groups, 8 channel groups can be formed in the optical network device 100. Further, in the drawing, each of the channel groups 110a to 110d is provided with four channel cards (for example, 111 to 114), but it is apparent that the number of channel cards mounted in each of the channel groups 110a to 110d can be increased or decreased according to the number of subscriber units that must be handled by the optical network device 100.

FIG. 10 is a conceptual block diagram showing an example of a channel card mounted in an optical network device.

The channel card includes a Radio Frequency (RF) unit RF, a Media Access Control_Physical (MAC_PHY) unit 111*d*, a channel assignment unit 111*e*, and a bus interface unit 111*f*.

The RF unit RF is connected to the coaxial cable of a subscriber unit side, and includes an RX unit 111*b* for receiving a network packet transmitted from the subscriber unit, a TX unit 111*c* for transmitting a network packet to the subscriber unit, and a diplexer 111*a*. The diplexer 111*a* separates a frequency band in which a cable broadcast signal is transmitted and a frequency band in which a network packet is transmitted, in order to prevent the cable broadcast signal from being received by the channel card (for example, 111) when a wired network (for example, a coaxial network) processes together the transmission of the cable broadcast signal and the transmission of the network packet. The MAC_PHY unit 111*d* supports CSMA/CD protocols according to the IEEE 802.3 standard and has a plurality of priority levels to ensure Quality of Service (QoS). Further, the MAC_PHY unit 111*d* performs functions corresponding to the following items so as to prevent collisions between the network access requests of subscriber units when the network access requests are generated.

4) A function of determining whether a data transmission station is present in a wired network when a network access request is generated by each subscriber unit, and determining whether to transmit data to the wired network on the basis of the results of determination.

5) A function of canceling the transmission of data when other stations are present in the wired network.

6) A function of randomly generating a transmission delay for network packets, which are transmitted to respective subscriber units, in order to prevent two or more data transmission stations from being generated in the wired network.

The channel assignment unit 111*e* assigns a frequency band to a given subscriber unit when the subscriber unit assigned to the channel card (for example, channel card 111) requests network access. The bus interface unit 111*f* transmits network packets, which are transmitted to or received from the subscriber unit assigned to the channel card (for example, channel card 111), to the media converter 150, or receives network packets from the media converter 150, and is assigned subscriber units in response to a control command from the channel control unit 250.

INDUSTRIAL APPLICABILITY

As described above, the present invention can generate a multi-channel for a wired network using the characteristics of the wired network divided into respective independent sectors, and can provide a wide frequency band to respective subscriber units through the generated multi-channel. Through this operation, each subscriber unit can realize a higher communication speed than in conventional network access using a wired network. Further, at a node where respective sectors branch off, a single frequency band is reused a number of times corresponding to the number of sectors, so that frequency resources can be efficiently used, and, in the case of a sector having a large number of subscriber units, a plurality of channel cards is made to correspond to the number of subscriber units, instead of dividing the frequency band of the sector into narrow frequency bands, thus being able to handle a large number of subscriber units.

The invention claimed is:

1. A multi-channel provision system for a wired network, comprising:

a tap-off unit for dividing a frequency band, assigned to a wired network for network communication, and providing resultant frequency bands to respective subscriber units belonging thereto;

an optical network device disposed at a node where one or more sectors, divided according to a number of subscriber units that enable network access through the wired network, branch off, the optical network device providing a frequency band for network access to each sector so that a same frequency band is assigned to each sector, thus generating a multi-channel for the frequency band, and reusing the frequency band, assigned to the wired network, a number of times corresponding to the number of the sectors through generation of the multi-channel, wherein the optical network device comprises: one or more channel cards mounted on a motherboard having a bus, the one or more channel cards corresponding to the one or more sectors and adapted to provide the same frequency band to each sector, thus generating the multi-channel for the frequency band; and a media converter for processing signal conversion between an optical network and the motherboard; and at least one repeater disposed between the optical network device and each of the subscriber units, the repeater amplifying intensity of network packet signals, thus increasing possible communication distance between the optical network device and the subscriber unit.

2. The multi-channel provision system according to claim 1, further comprising a splitter constructed so that, when two or more sectors correspond to the frequency band assigned to a single wired network in the optical network device, the splitter is disposed between the two or more sectors and the optical network device and is adapted to distribute the frequency band assigned by the optical network device according to the number of sectors and to assign distributed frequency bands to the two or more sectors.

3. The multi-channel provision system according to claim 1, further comprising an Ethernet Coaxial Bridge (ECB) constructed so that, when the subscriber unit is connected to the network through an x Digital Subscriber Line (xDSL) modem, the ECB is disposed between the tap-off unit and the xDSL modem and is adapted to process signal conversion between the xDSL modem and the tap-off unit.

4. The multi-channel provision system according to claim 1, wherein each of the subscriber units is one of a Voice over Internet Protocol (VoIP) modem, a cable modem, and an xDSL modem.

5. The multi-channel provision system according to claim 1, further comprising an Access Point (AC) disposed between the tap-off unit and a wireless communication device and adapted to perform wireless communication with the wireless communication device.

6. The multi-channel provision system according to claim 1, wherein the optical network device assigns the same frequency band that is assigned to any one of subscriber units belonging to each sector, to any one of subscriber units belonging to another sector.

7. The multi-channel provision system according to claim 1, wherein the channel card is provided such that at least two channel cards correspond to any one of the sectors and the frequency band is divided according to the number of channel cards.

8. The multi-channel provision system according to claim 7, further comprising a channel control unit for arranging a subscriber unit in any one of channel cards corresponding to a sector to which the subscriber unit belongs, when a communication channel access request is generated by the subscriber unit.

9. The multi-channel provision system according to claim 8, wherein the channel control unit is operated such that, when a communication channel access request is generated by the subscriber unit, the channel control unit makes the subscriber unit correspond to any one of channel cards corresponding to a sector, to which the subscriber unit belongs, channel connection being sequentially performed for the channel cards.

10. The multi-channel provision system according to claim 8, wherein the channel control unit is operated such that, when a communication channel access request is generated by the subscriber unit, the channel control unit makes the subscriber unit correspond to a channel card having a smallest number of channels formed with subscriber units, among channel cards corresponding to a sector to which the subscriber unit belongs.

11. The multi-channel provision system according to claim 8, further comprising a filter connected to an output terminal of at least one channel card corresponding to the sector and adapted to pass therethrough only a frequency band assigned to the channel card.

12. The multi-channel provision system according to claim 1, wherein the channel card comprises: a diplexer for separating a frequency band, which is assigned to Internet communication, and a frequency band, which is assigned to broadcast signals, from the frequency band assigned to the sector; a Radio Frequency (RF) unit for performing RF communication with the sector according to the frequency band assigned by the diplexer for the Internet communication; and a bus interface unit for performing data communication with the media converter through the bus of the motherboard.

* * * * *